US012689873B2

(12) United States Patent
Whelden et al.

(10) Patent No.: US 12,689,873 B2
(45) Date of Patent: Jul. 21, 2026

(54) DISASTER PREDICTION AND RESPONSE USING VIDEO ANALYTICS AND POSITIONING DATA

(71) Applicant: MOTOROLA SOLUTIONS, INC., Chicago, IL (US)

(72) Inventors: Nathan Whelden, Plantation, FL (US); David Corvino, Parkland, FL (US); Luis Costoya, Hialeah, FL (US); Karl F. Mueller, Sunrise, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 293 days.

(21) Appl. No.: 18/397,611

(22) Filed: Dec. 27, 2023

(65) Prior Publication Data

US 2025/0220395 A1 Jul. 3, 2025

(51) Int. Cl.
*G06Q 10/04* (2023.01)
*G06Q 10/063* (2023.01)
(Continued)

(52) U.S. Cl.
CPC ............. *H04W 4/12* (2013.01); *H04W 4/021* (2013.01); *H04W 4/06* (2013.01); *H04W 4/90* (2018.02)

(58) Field of Classification Search
CPC ......... H04W 4/12; H04W 4/021; H04W 4/06; H04W 4/90
See application file for complete search history.

(56) References Cited

U.S. PATENT DOCUMENTS 5,910,763 A    6/1999   Flanagan
6,028,626 A *   2/2000   Aviv ................ G08B 13/19602
                              382/118

(Continued)

FOREIGN PATENT DOCUMENTS

IN      202341064044 A * 10/2023
WO    WO-2015112892 A1 * 7/2015  ............. G06Q 10/04

OTHER PUBLICATIONS

International Search Report and Written Opinion for Application No. PCT/US2024/057519 dated May 28, 2025 (18 pages).
(Continued)

*Primary Examiner* — Wesley L Kim
*Assistant Examiner* — Fabian Botello
(74) *Attorney, Agent, or Firm* — Michael Best & Friedrich LLP

(57) ABSTRACT

A server may include an electronic processor configured to broadcast an incident alert to a plurality of communication devices within a geographical area associated with an imminent incident, the incident alert including an enrollment feature, receive, via the enrollment feature in response to the incident alert, enrollment notifications from the plurality of communication devices for enrolling the plurality of communication devices in incident response location tracking for the incident, divide the plurality of communication devices into a plurality of location-based clusters based on pre-incident location information of the plurality of communication devices; and rank the plurality of location-based clusters based on location behavior of communications devices within each of the plurality of location-based clusters.

14 Claims, 5 Drawing Sheets

(51) Int. Cl.

| | |
|---|---|
| *G06Q 50/22* | (2024.01) |
| *G06Q 50/50* | (2024.01) |
| *H04W 4/021* | (2018.01) |
| *H04W 4/06* | (2009.01) |
| *H04W 4/12* | (2009.01) |
| *H04W 4/90* | (2018.01) |

(56) References Cited

U.S. PATENT DOCUMENTS

| | | | |
|---|---|---|---|
| 6,169,476 B1 | 1/2001 | Flanagan | |
| 7,411,493 B2 | 8/2008 | Smith | |
| 12,063,581 B2 * | 8/2024 | Martin ................ | H04M 3/5141 |
| 2015/0146547 A1 * | 5/2015 | Kapnadak ......... | H04W 28/0236 |
| | | | 370/252 |
| 2018/0338250 A1 * | 11/2018 | Mishra .................. | H04W 24/02 |
| 2019/0261145 A1 * | 8/2019 | South ...................... | H04W 4/30 |
| 2020/0380404 A1 | 12/2020 | Rakshit et al. | |

OTHER PUBLICATIONS

Invitation to Pay Additional Fees for Application No. PCT/US2024/057519 dated Apr. 7, 2025 (13 pages).

* cited by examiner

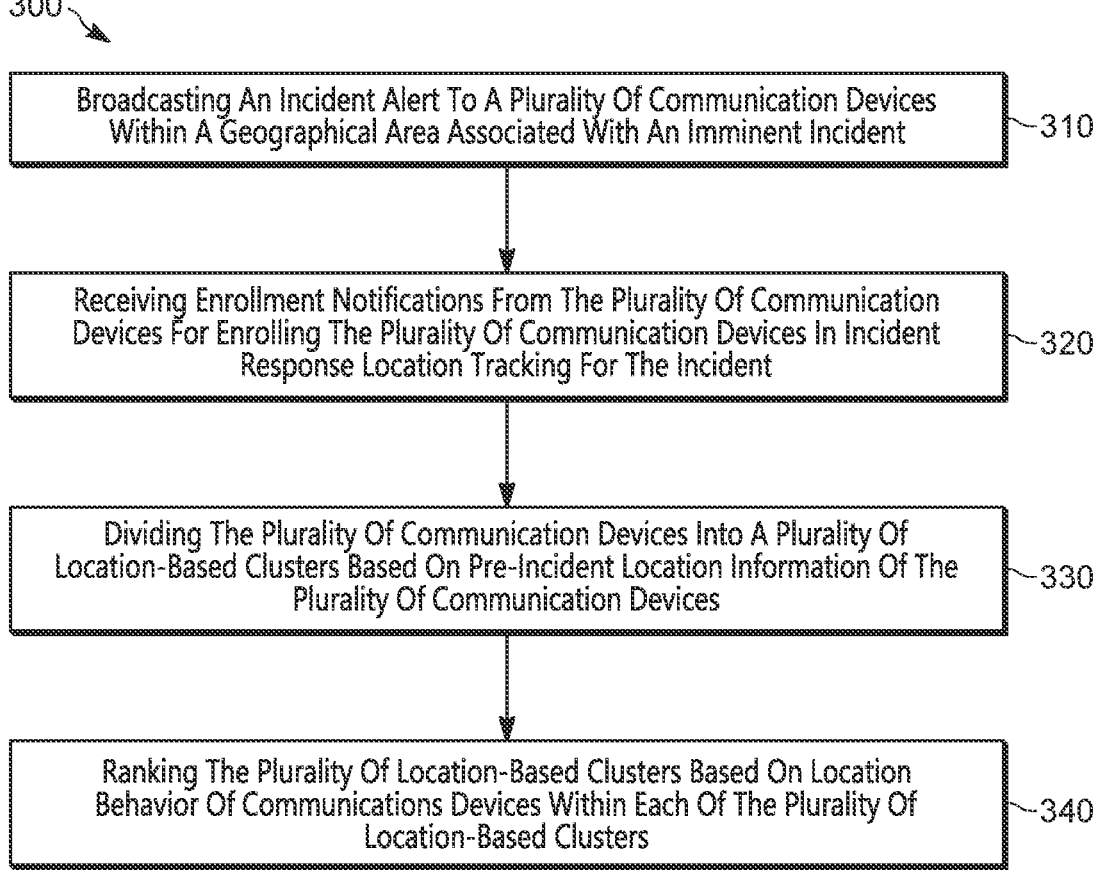

300

Broadcasting An Incident Alert To A Plurality Of Communication Devices Within A Geographical Area Associated With An Imminent Incident ~310

Receiving Enrollment Notifications From The Plurality Of Communication Devices For Enrolling The Plurality Of Communication Devices In Incident Response Location Tracking For The Incident ~320

Dividing The Plurality Of Communication Devices Into A Plurality Of Location-Based Clusters Based On Pre-Incident Location Information Of The Plurality Of Communication Devices ~330

Ranking The Plurality Of Location-Based Clusters Based On Location Behavior Of Communications Devices Within Each Of The Plurality Of Location-Based Clusters ~340

Receiving Location Information From Plurality of Communication Devices ~610

Determining Location Features From Location Information ~620

Generate Plurality of Location-Based Clusters Based on Location Features ~630

DISASTER PREDICTION AND RESPONSE USING VIDEO ANALYTICS AND POSITIONING DATA

BACKGROUND

Mass-casualty events, for example, natural disasters such as storms, hurricanes, tornadoes, sandstorms, and the like, active-shooter events, or the like can cause widespread damage to people and property. Government and meteorological services attempt to predict natural disasters to warn civilians and to issue evacuation or shelter in place orders. Rescue and response efforts are then commenced by public safety organizations (e.g., emergency services, fire departments, and police organizations) post-incident.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments, examples, aspects, and features of concepts that include the claimed subject matter, and to explain various principles and advantages of those embodiments, examples, aspects, and features.

FIG. 3 is a flowchart of a method for disaster prediction and response implemented by the system of FIG. 1 in accordance with some examples.

Figure 1:
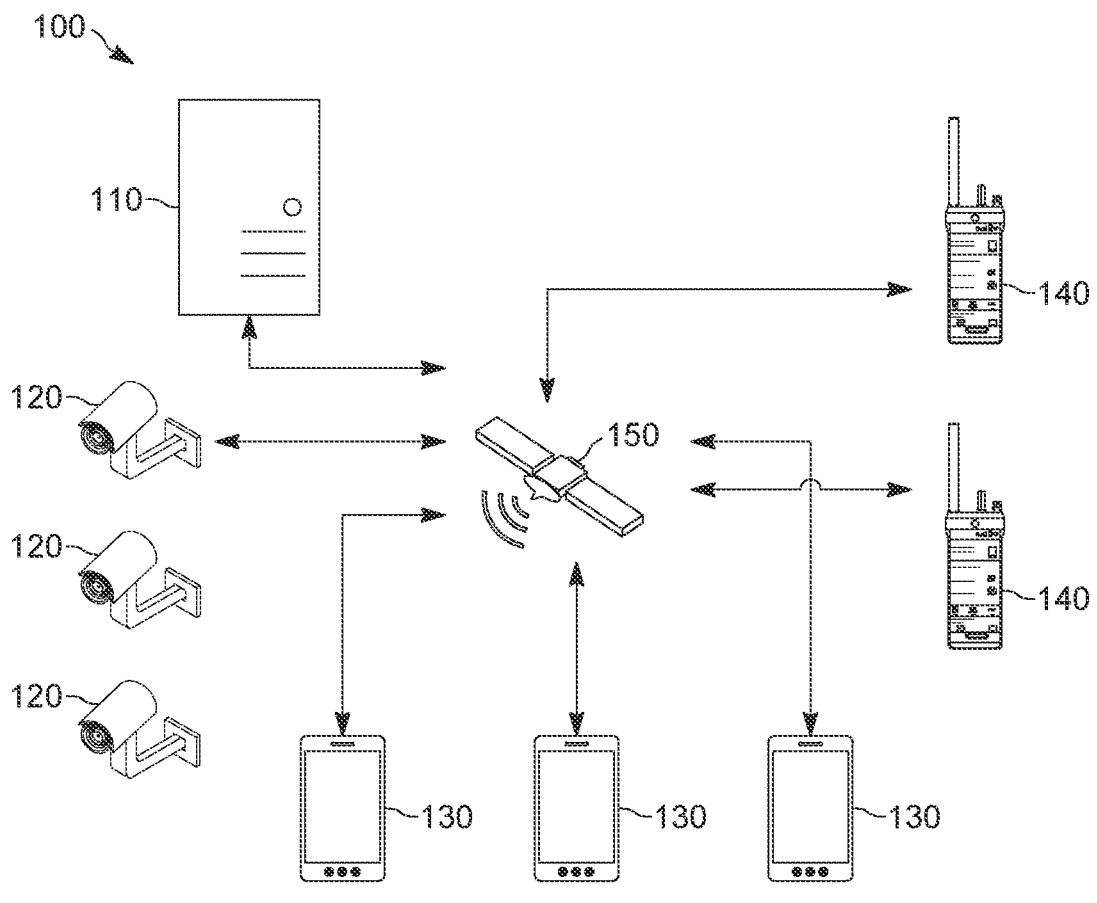
FIG. 1 is a simplified block diagram of a system for disaster prediction and response in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help improve understanding of the examples, aspects, and features presented in this disclosure.

The system, apparatus, and method components have been represented where appropriate by conventional symbols in the drawings, showing only those specific details that are pertinent to understanding of the various embodiments, examples, aspects, and features of the present disclosure so as not to obscure the disclosure with details that will be readily apparent to those of ordinary skill in the art having the benefit of the description herein.

DETAILED DESCRIPTION OF THE INVENTION

Current methods of predicting natural disaster include human prediction or algorithmic based models based on meteorological data. These methods are usually slow and/or inaccurate in predicting natural disasters. In some situations, current models may fail to predict natural disasters before they occur. Similar problems exist for other mass-casualty events. Accordingly, there is a need for improving current technology for predicting natural disasters or other mass-casualty events.

In addition to the above, the public safety organizations usually do not have much information relating to the civilians present in an affected geographical area. Responding public safety personnel usually proceed with rescue efforts on an ad-hoc basis. For example, the rescue efforts may prioritize certain areas even though no civilians may be preset in that area. Such methods may miss other areas where a significant amount of civilian population needing help may be present. Specifically, location information of civilians and the current activity status (for example, mobile vs. non-mobile) is not readily available for first responders so that the first responders can triage rescue efforts. Accordingly, there is a need for improving disaster response.

One embodiment provides server for disaster prediction and response including: an electronic processor configured to broadcast an incident alert to a plurality of communication devices within a geographical area associated with an imminent incident, the incident alert including an enrollment feature; receive, via the enrollment feature in response to the incident alert, enrollment notifications from the plurality of communication devices for enrolling the plurality of communication devices in incident response location tracking for the incident; divide the plurality of communication devices into a plurality of location-based clusters based on pre-incident location information of the plurality of communication devices; and rank the plurality of location-based clusters based on location behavior of communications devices within each of the plurality of location-based clusters.

Another embodiment provides a method for disaster prediction and response including: broadcasting, using an electronic processor, an incident alert to a plurality of communication devices within a geographical area associated with an imminent incident, the incident alert including an enrollment feature; receiving, via the enrollment feature in response to the incident alert using the electronic processor, enrollment notifications from the plurality of communication devices for enrolling the plurality of communication devices in incident response location tracking for the incident; dividing, using the electronic processor, the plurality of communication devices into a plurality of location-based clusters based on pre-incident location information of the plurality of communication devices; and ranking, using the electronic processor, the plurality of location-based clusters based on location behavior of communications devices within each of the plurality of location-based clusters.

Each of the above-mentioned examples will be discussed in more detail below, starting with example system and device architectures of the system in which the examples may be practiced, followed by an illustration of processing blocks for achieving an improved technical method, device, and system for disaster prediction and response.

Examples are herein described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some aspects, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any example, feature, aspect, or embodiment discussed in this specification can be implemented or combined with any part of any other example, feature, aspect, or embodiment discussed in this specification.

Further advantages and features consistent with this disclosure will be set forth in the following detailed description, with reference to the figures.

Referring now to the drawings, and in particular FIG. 1, a system 100 for disaster prediction and response includes a server 110, a plurality of image capture devices 120, a plurality of communication devices 130, a plurality of responder devices 140, communicating over a communication network 150. The system 100 may include more or fewer components and may perform functions other than those listed herein. The server 110 may be implemented by one or more entities (for example, public safety entities) for disaster prediction and response. In one example, the server 110 may be implemented in a cloud computing system with components or resources and functionality of the server distributed across various devices.

The plurality of image capture devices 120 include, for example, closed-circuit television (CCTV) cameras, surveillance cameras, traffic cameras, dashboard cameras, or the like. The plurality of image capture devices 120 provide media (that is, images and/or videos) to the server 110 over the communication network 150. Metadata may be attached to the media provided by the plurality of image capture devices 120 that identifies the camera, the location, the orientation, the date, the time, and the like associated with the media.

The plurality of communication devices 130 include, for example, smart telephones, paging devices, wearable devices, tablet computers, or the like of civilians. The plurality of communication devices 130 may include civilian devices that signed up for an emergency preparedness service, or the like. The plurality of communication devices 130 can communicate with the server 110 over the communication network 150. The plurality of communication devices 130 may periodically provide location information (that is, mobile positioning data from base stations (for example, cell towers) or GPS), activity information, state of charge information, movement information or the like to the server 110.

The plurality of responder devices 140 include, for example, mobile radios, portable radios, smart telephones, wearable devices, laptop computer, vehicle-mounted computers, tablet computers, and the like of public safety personnel responding to an incident. The communication network 150 may include a wired and/or wireless network, for example, a satellite network, a cellular network, the Internet, and the like to facilitate communication between the server 110, the plurality of image capture devices 120, the plurality of communication devices 130, and the plurality of responder devices 140.

Figure 2:
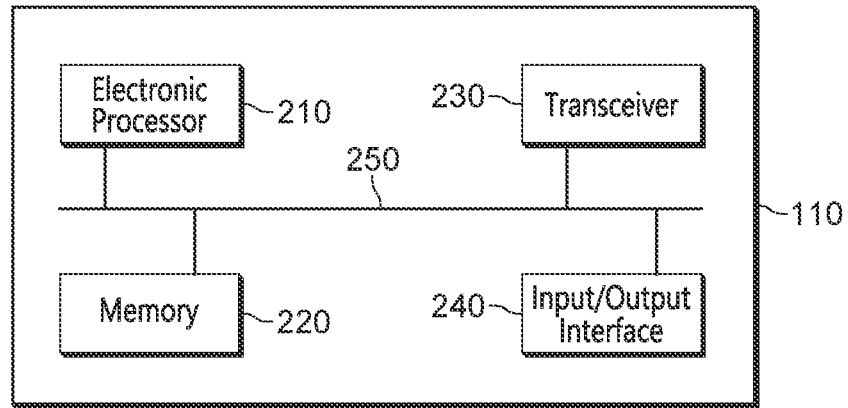
FIG. 2 is a simplified block diagram of a server of the system of FIG. 1 in accordance with some examples.

FIG. 2 is a block diagram of one example of the server 110. In the example illustrated, the server 110 includes an electronic processor 210, a memory 220, a transceiver 230, and an input/output interface 240. The electronic processor 210, the memory 220, the transceiver 230, and the input/output interface 240 communicate over one or more control and/or data buses (for example, a communication bus 250). FIG. 2 illustrates only one example of the server 110. The server 110 may include more or fewer components and may perform functions other than those explicitly described herein.

In some examples, the electronic processor 210 is implemented as a microprocessor with separate memory, such as the memory 220. In other examples, the electronic processor 210 may be implemented as a microcontroller (with memory 220 on the same chip). In other examples, the electronic processor 210 may be implemented using multiple processors. In addition, the electronic processor 210 may be implemented partially or entirely as, for example, a field-programmable gate array (FPGA), an applications specific integrated circuit (ASIC), an x86 processor, and the like and the memory 220 may not be needed or be modified accordingly. In the example illustrated, the memory 220 includes non-transitory, computer-readable memory that stores instructions that are received and executed by the electronic processor 210 to carry out the functionality of the server 110 described herein. The memory 220 may include, for example, a program storage area and a data storage area. The program storage area and the data storage area may include combinations of different types of memory, such as read-only memory and random-access memory. In some embodiments, the server 110 may include one electronic processor 210, and/or a plurality of electronic processors 210 in a cloud computer cluster arrangement, one or more of which may be executing none, all, or a portion of the applications or instructions of the server 110 provided below, sequentially or in parallel across the one or more electronic processors 210. The one or more electronic processor 210 comprising the server 110 may be geographically co-located or may be separated (for example, by miles), and interconnected via electronic and/or optical interconnects. One or more proxy servers or load balancing servers may control which one or more electronic processors 210 perform any part or all of the applications provided below.

The transceiver 230 enables wired and/or wireless communication between the server 110 and the plurality of image capture devices 120, the plurality of communication devices 130, and the plurality of responder devices 140, over the communication network 150. In some examples, the transceiver 230 may comprise separate transmitting and receiving components. The input/output interface 240 may include one or more input mechanisms (for example, a touch pad, a keypad, and the like), one or more output mechanisms (for example, a display, a speaker, and the like), or a combination thereof, or a combined input and output mechanism such as a touch screen.

In the example illustrated in FIG. 2, a single device is illustrated as including all the components and the applications of the server 110. However, it should be understood that one or more of the components and one or more of the applications may be combined or divided into separate software, firmware and/or hardware. Regardless of how they are combined or divided, these components and application may be executed on the same computing device or may be distributed among different computing devices connected by one or more networks or other suitable communication means. In one example, all the components and applications of the server 110 are implemented in a cloud infrastructure accessible through several terminal devices, with the processing power located at a server location. In another example, the components and applications of the server 110 may be divided between separate intelligence center computing device and dispatch device co-located at an intelligence center or dispatch center of a responding organization (e.g., a police department). In yet another example, the components and applications of the server 110 may be divided between separate computing devices not co-located with each other but communicatively connected with each other over a suitable communication network.

Figure 4:
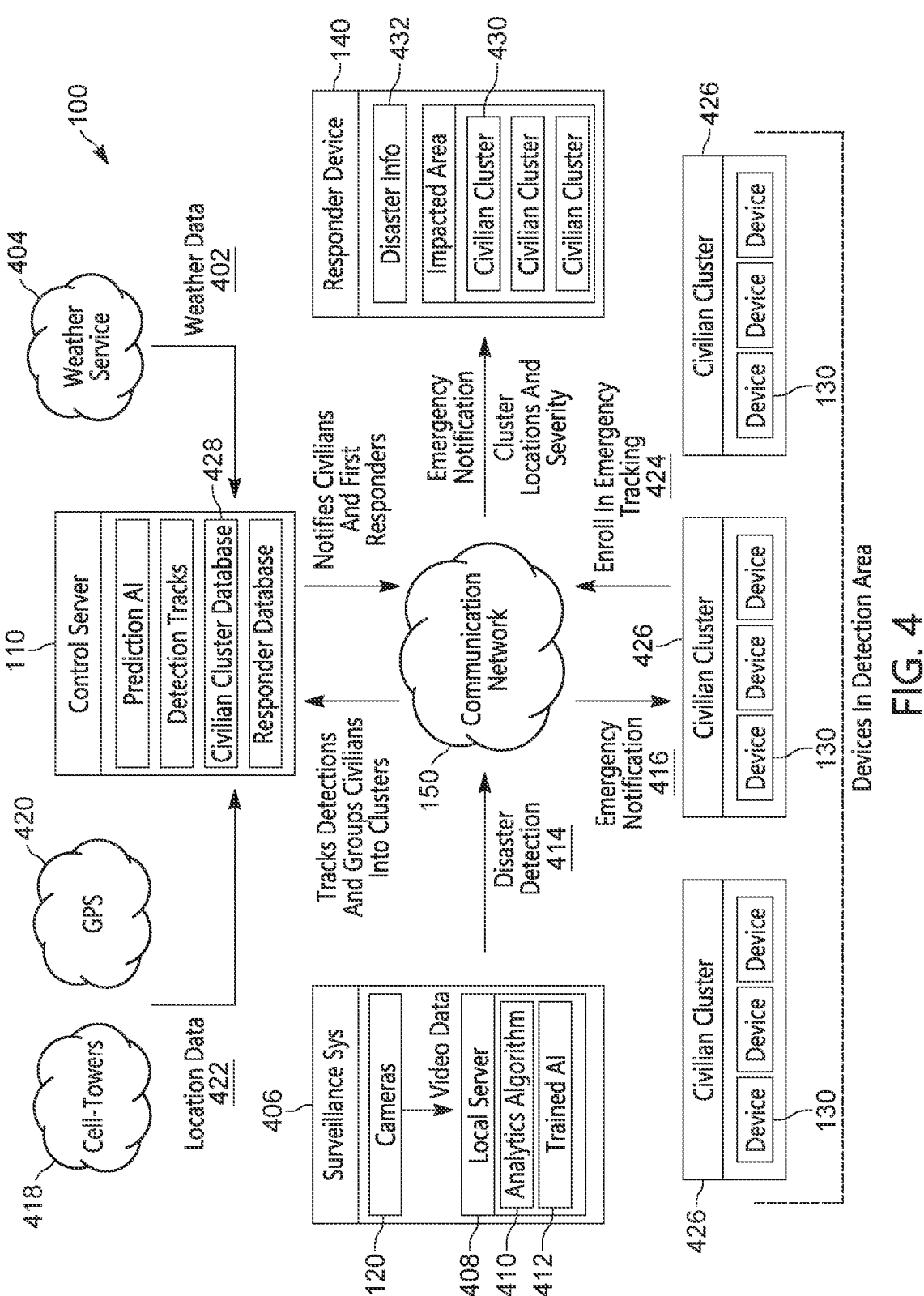
FIG. 4 is a simplified block diagram of the system of FIG. 1 in accordance with some examples.

FIG. 3 is a flowchart of an example method 300 for disaster prediction and response in accordance with some embodiments. The method 300 is implemented, for example, using the system 100. FIG. 4 is a simplified block diagram of one example implementation of the system 100 providing additional details regarding the various applications and flow of information or data between the various components of the system 100 for the example. The example implementation is a natural disaster, for example, a hurricane, an earth quake, or the like. The method 300 of FIG. 3 is explained below with additional reference to FIG. 4. However, the method 300 can also be used with other public safety incidents.

The method 300 includes broadcasting, using the electronic processor 210, an incident alert to a plurality of communication devices within a geographical area associated with an imminent incident (at block 310). As shown in FIG. 4, the server 110 receives weather data 402 from a weather service 404. The weather service 404 is, for example, a local meteorological service or the like that gathers weather and meteorological information related to a coverage area of the weather service 404. In one example, the weather service 404 may provide information relating to the imminent incident to the server 110.

In some examples, the imminent incident may be predicted using an artificial intelligence prediction model. The plurality of image capture devices 120 may be part of a surveillance system 406. The surveillance system 406 also includes a local server 408 having an analytics application 410 and an artificial intelligence prediction model application 412. In one example, the artificial intelligence prediction model application 412 is a pre-trained model that receives media from the plurality of image capture devices 120 and predicts a likelihood of an imminent incident. The artificial intelligence prediction model application 412 can be trained prior to deployment based on pre-labeled media available through meteorological services. In some examples, the artificial intelligence prediction model application 412 is trained using the media collected by the surveillance system 406. In one example, the artificial intelligence prediction model application 412 may receive images of cloud structures and shapes and predict that a tornado or storm will soon occur. After predicting that an imminent incident is likely to occur (that is, for example, >25% chance of an imminent incident), the analytics application 410 may track the direction of the imminent incident. For example, when the imminent incident is a hurricane, a storm, a sandstorm, or a tornado, the analytics application 410 tracks the direction the imminent incident is moving. The direction may also be detected using the artificial intelligence prediction model application 412. The surveillance system 406 provides the disaster detection information 414 to the server 110 over the communication network 150.

The server 110 sends the incident alert 416 in response to receiving imminent incident information from the weather service 404 or the surveillance system 406 determining that an imminent incident is likely to occur at a geographical area. The surveillance system 406 may predict, using the artificial intelligence prediction model application 412, the incident based on pre-incident media of the geographical area received from the plurality of image capture devices 120. The incident alert 416 is provided to the plurality of communication devices 130 within the geographical area. The location (that is, positioning data) of the plurality of communication devices 130 can be determined based on triangulation using base stations 418 or using a global positioning system (GPS) service 420. The base stations 418 and the GPS service 420 provide location information 422 of the plurality of communication devices 130 to the server 110.

The incident alert 416 includes an enrollment feature. The enrollment feature provides an option to uses of the plurality of communication devices 130 to opt-in for the incident response. Enrolling in the incident response allows for location tracking, activity tracking, and the like for the plurality of communication devices 130.

The method 300 also includes receiving, via the enrollment feature in response to the incident alert 416 using the electronic processor 210, enrollment notifications 424 from the plurality of communication devices 130 for enrolling the plurality of communication devices 130 in incident response location tracking for the incident (at block 320). When a user of a communication device 130 opts in, an enrollment notification 424 is sent from the communication device 130 to the server 110. In response to receiving the enrollment notification 424, the server 110 may group the plurality of communication devices 130 into enrolled devices and unenrolled devices. The enrolled devices may be further tracked as explained below through the incident and the incident response. The unenrolled devices may not be tracked during the incident and the incident response. For simplicity, the enrolled devices are referred to as the plurality of communication devices 130 in the following explanation.

The method 300 includes dividing, using the electronic processor 210, the plurality of communication devices 130 into a plurality of location-based clusters 426 based on pre-incident location information of the plurality of communication devices 130 (at block 330). The server 110 receives pre-incident location from each of the plurality of communication devices 130. The location information may be received from the base stations 418 or the GPS service 420. The location information is received prior to the occurrence of the incident, for example, along with the enrollment notification. The server 110 uses a clustering technique to divide the plurality of communication devices 130 into the plurality of location-based clusters 426. The clustering technique is, for example, a clustering algorithm that groups devices within a pre-defined proximity to each other into a cluster. An example method 600 for dividing the plurality of communication devices 130 into a plurality of location-based clusters is explained below with respect to FIG. 6. Each cluster of the plurality of location-based clusters 426 may include a unique identifier that is used to identify the cluster. The information regarding each cluster of the plurality of location-based clusters 426 may be stored in a civilian cluster database 428 of the server 110. For example, the civilian cluster database 428 may include a relational database that stores the identifiers of the plurality of communication devices 130 belonging to a cluster in relation with the identifier of the cluster.

In some examples, continuing alerts may be provided during the incident. The artificial intelligence prediction model application 412 may continuously receive media from the plurality of image capture devices 120 and update the severity and path of the incident (or disaster). The alerts may provide different information to different communication devices 130 based on the current location of the communication device 130. For example, a first alert to communication devices 130 in a first location-based cluster 426 may provide instructions to move to a different safe location, whereas a second alert to communication devices 130 in a second location-based cluster 426 may provide instructions to shelter in place. The continuing alerts may provide information relating to the severity of the incident for the location of the location-based cluster. In some examples, the server 110 may also identify a designated communication device 130 for each cluster of the plurality of location-based clusters 426. The designated communication device 130 may be used to provide specific instructions to the user of the designated communication device 130 as further explained below.

The method 300 includes ranking, using the electronic processor 210, the plurality of location-based clusters 426 based on location behavior of communications devices 130 within each of the plurality of location-based clusters 426 (at block 340). The plurality of location-based clusters 426 may be ranked by severity or urgency in recovery during an incident or incident response. In one example, the plurality of location-based clusters 426 are ranked based on proximity to the area with the highest impact from the incident. In another example, the plurality of location-based clusters 426 are ranked based on the number of inactive communication devices 130 (that is, man-down devices) in the plurality of location-based clusters 426. In some examples, the server 110 ranks the plurality of location-based clusters 426 based on predetermined cluster parameters including, for example, number of communication devices in a location-based cluster 426, proximity of location-based cluster 426 to a high-impact zone of the incident, number of non-operable communication devices 130, demographics of owners (for example, age, physical disability, pre-existing medication condition, injuries, or the like) of communication devices within a location-based cluster 426, or the like are used to rank the plurality of location-based clusters 426.

In some examples, the location behavior of a communication device 130 is labeled as operable or non-operable. A location behavior of a first communication device 130 is operable when a current location of the first communication device 130 can be determined. The location behavior of the first communication device 130 is non-operable when the current location of the first communication device 130 cannot be determined. The current location can be determined when a current location is received from the base stations 418 or the GPS service 420, for example, based on a request from the server 110. The current location cannot be determined when no location information is received in response to the request from the server 110. The server 110 assigns a higher rank to a first location-based cluster 426 of the plurality of location-based clusters 426 than a second location-based cluster 426 of the plurality of location-based clusters 426 when the first location-based cluster 426 has a higher number of non-operable communication devices 130 than the second location-based cluster 426. In one example, a first location-based cluster 426 having ten non-operable communication devices 130, a second location-based cluster 426 having five non-operable communication devices 130, and a third location-based cluster 426 having no non-operable communication devices 130 may be ranked one, two, and three respectively (that is, one is considered higher ranked than two or three).

Figure 5:
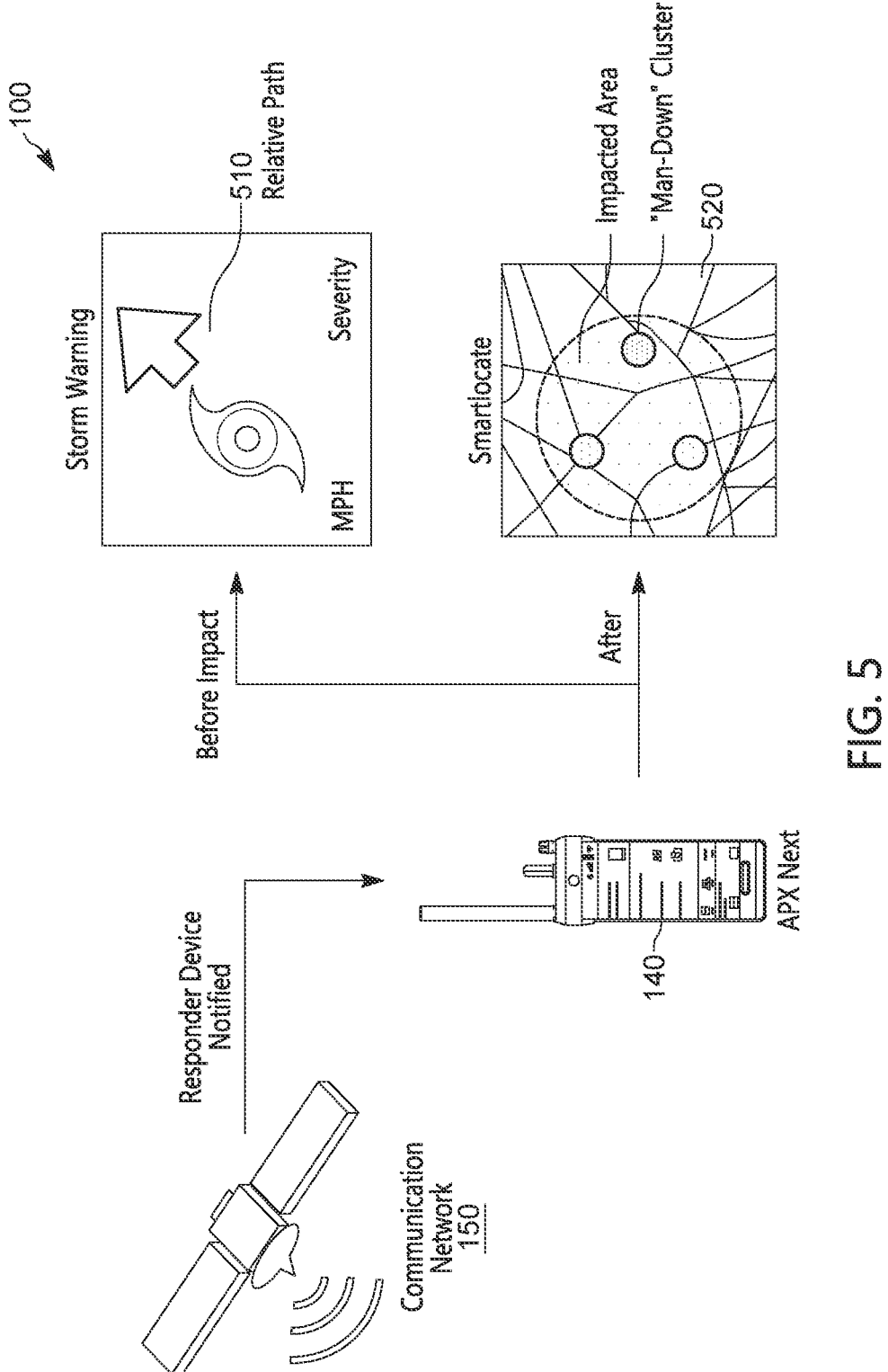
FIG. 5 is an example communication between a server and responder device of the system of FIG. 1 in accordance with some examples.

The method 300 may also include communicating, using the electronic processor 210, locations and ranking of the plurality of location-based clusters 426 to a responder device 140. The ranked list 430 of the plurality of location-based clusters 426 is provided to the plurality of responder devices 140 over the communication network 150. The server 110 also provides the disaster information 432, for example, the path of the disaster, impact areas, and the like the plurality of responder devices 140. The responding public safety organization may use the disaster information 432 and the ranked list 430 of the plurality of location-based clusters 426 to prioritize rescue and response efforts. FIG. 5 illustrates an example communication sent to a responder device 140. The communication may include a relative path 510 of a disaster before impact of the disaster. The communication may include the impact area, the location of the plurality of location-based clusters 426, the ranking (for example, color-coded ranking) of the plurality of location-based clusters 426 overlayed on a map 520 of the geographical area.

In some examples, the server 110 provides pre-incident media for the plurality of location-based clusters 426 to help in rescue and response efforts. The server 110 identifies an image capture device 120 having a field of view of a location-based cluster 426 of the plurality of location-based clusters 426. The field of view may include a portion of a location identified as including a location-based cluster 426. The server 110 collects, using the image capture device 120, pre-incident media for the location-based cluster 426. The pre-incident media may be captured prior to the incident occurring and before or after sending the incident alert. The server 110 relates the collected pre-incident media with the location-based cluster 426. For example, the server 110 stores the pre-incident media in the relational database storing the plurality of location-based clusters 426 in relation to the location-based cluster 426. The server 110 communicates the pre-incident media and relation information relating the pre-incident media with the location-based cluster 426 to the plurality of responder devices 140. The pre-incident media may be sent along with the ranked list 430 to the plurality of responder devices 140.

In some examples, currently collected media can be compared to the pre-incident media for a location-based cluster 426 to rank the plurality of location-based clusters 426. The server 110 may continuously collect media during and post-incident (that is, current media) for a location-based cluster 426. This current media is then compared to pre-incident media to identify issues (that is, location behavior) with the location-based cluster 426. For example, the comparison may reveal trapped civilians, no safety impact to the area, or the like. The plurality of location-based clusters 426 are ranked further based on any issues identified based on this comparison.

In some examples, a communication line may be opened with each of the plurality of location-based clusters 426 to receive feedback relating to the cluster. The server 110 assigns a first communication device 130 of the plurality of communication devices 130 from a first location-based cluster 426 of the plurality of location-based clusters 426 as a designated device. The server 110 establishes a communication link with the designated device while de-prioritizing communications with other communication devices 130 from the first location-based cluster 426. De-prioritizing communication from non-designated devices 130 allows for preservation of limited bandwidth available during an incident for emergency communications. The communication link can be used to receive feedback relating to the incident and/or the first location-based cluster 426 from the designated device. In some examples, the server 110 re-ranks the plurality of location-based clusters 426 based on the feedback from the designated device. For example, a feedback from the designated device may indicate trapped civilians. The server 110 may move the first location-based cluster 426 higher in the rankings based on this feedback. In another examples, a feedback from the designated device may indicate safe civilians even when the first-location based cluster includes a high number of non-operative communication devices 130. The server 110 may move the first location-based cluster 426 lower in the rankings based on this feedback. The server 110 may assign a different communication device if the first communication device 130 is non-responsive. For example, the server 110 may determine a loss of the communication link with the designated device. The server 110 assigns a second communication device 130 of the plurality of communication devices 130 from the first location-based cluster 426 as the designated device. The loss of communication link may be, for example, due to a depleted battery of the first communication device 130, non-response device, or the like.

In some examples, the designated devices or other devices of the plurality of location-based clusters 426 can capture and upload media in real-time to help with the rescue efforts. Additionally, instructions for rescue efforts may be provided to the plurality of communication devices 130 based on their location. The server 110 may geofence the plurality of communication devices 130 based on location and provide alerts and instructions corresponding to the location-based cluster 426 of the communication device 130.

Figure 6:
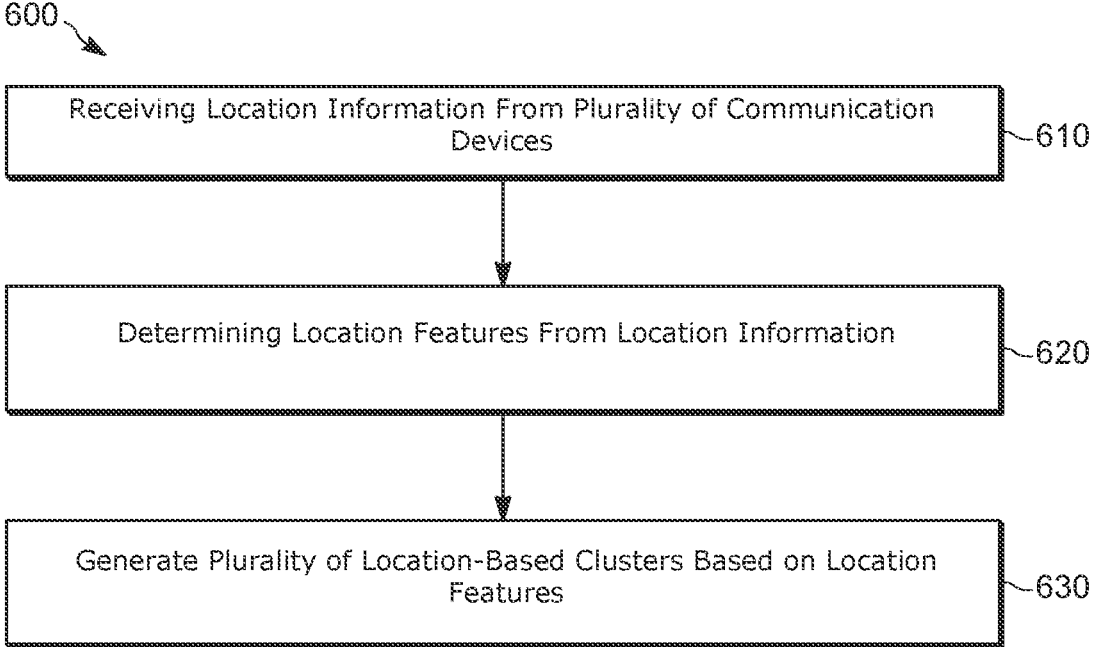
FIG. 6 is a flowchart of a method for dividing a plurality of communication devices of the system of FIG. 1 into a plurality of location-based clusters in accordance with some examples.

FIG. 6 is a flowchart of an example method 600 for dividing the plurality of communication device 130 into a plurality of location-based clusters 426 in accordance with some embodiments. The method 600 is implemented, for example, using the system 100. The method 600 includes receiving, using the electronic processor 210, location information from the plurality of communication device 130 (at block 610). As described above, the server 110 receives pre-incident location from each of the plurality of communication devices 130. The location information may be received from the base stations 418 or the GPS service 420. The location information is received prior to the occurrence of the incident, for example, along with the enrollment notification. Separate location information may be received for each of the plurality of communication devices 130. That is, each one of the plurality of communication devices 130 may be provide separate location information unique to the one of the plurality of communication devices 130.

The method 600 includes determining, using the electronic processor 210, location features based on the location information (at block 620). Location features include, for example, features of the location at which the communication device 130 (that is, one of the plurality of communication devices 130) is present. For example, one location feature determined from the location information (for example, GPS coordinates) may include determining that the location is an office building, a residential building, a shopping mall, or the like. In other examples, location features may include security features (for example, whether the location is in a gated community, or the like), safety features (for example, whether the location is located near a chemical facility, includes flammable or dangerous chemicals, or the like), and the like features relating to the location where the communication device 130 is present.

The method 600 includes generating, using the electronic processor 210, a plurality of location-based clusters based on location features (at block 630). In one example, the electronic processor 210 may group all of the plurality of communication devices 130 (for example, a subset of the plurality of communication devices 130) that are located in a building into a single location-based cluster. In other examples, different clustering techniques, for example, K-means, K-means++, K-mediods, K-medians, K-nearest neighbors, Density-Based Spatial Clustering of Applications with Noise (DBSCAN), or the like are used to generate the plurality of location-based clusters. These clustering techniques receive the plurality of locations, plurality of location features, or the like as inputs and generates, for example, separate files for each location-based clusters with each location-based cluster file including identification information of the plurality of communication devices 130 belonging to a location-based cluster that is identified by the file. Once the plurality of location-based clusters are generated, the files may be stored in a cluster database (for example, memory 220) for later retrieval by the electronic processor 210 as further described above.

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot divide plurality of communications devices into clusters and rank the clusters based on location behavior of the communications devices, among other features and functions set forth herein).

In the foregoing specification, specific embodiments, examples, aspects, and features have been described. However, one of ordinary skill in the art appreciates that various modifications and changes can be made without departing from the scope of the subject matter as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

Also, it should be understood that the illustrated components, unless explicitly described to the contrary, may be combined or divided into separate software, firmware, and/ or hardware. For example, instead of being located within and performed by a single electronic processor, logic and processing described herein may be distributed among multiple electronic processors. Similarly, one or more memory modules and communication channels or networks may be used even if embodiments described or illustrated herein have a single such device or element. Also, regardless of how they are combined or divided, hardware and software components may be located on the same computing device or may be distributed among multiple different devices. Accordingly, in this description and in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

It will be appreciated that some embodiments, examples, aspects, and features may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, one or more of the embodiments, examples, aspects, and features presented herein can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of," without a more limiting modifier such as "only one of," and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled," "coupling," or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples and embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A server for disaster prediction and response comprising:

an electronic processor configured to broadcast an incident alert to a plurality of communication devices within a geographical area associated with an imminent incident, the incident alert including an enrollment feature;

receive, via the enrollment feature in response to the incident alert, enrollment notifications from the plurality of communication devices for enrolling the plurality of communication devices in incident response repeated location tracking for the incident;

divide the plurality of communication devices into a plurality of location-based clusters based on pre-incident location information of the plurality of communication devices; and rank the plurality of location-based clusters based on location behavior of communications devices within each of the plurality of location-based clusters;

label a first subset of the plurality of communication devices as operable based on determining a current location of the first subset of the plurality of communication devices;

label a second subset of the plurality of communication devices as non-operable based on determining that a current location of the second subset of the plurality of communication devices cannot be determined;

assign a higher rank to a first location-based cluster of the plurality of location-based clusters than a second location-based cluster of the plurality of location-based clusters when the first location-based cluster has a higher number of non-operable communication devices than the second location-based cluster.

2. The server of claim 1, wherein the electronic processor is further configured to communicate locations and ranking of the plurality of location-based clusters to a responder device.

3. The server of claim 2, wherein the electronic processor is further configured to identify an image capture device having a field of view of a location-based cluster of the plurality of location-based clusters;

collect, using the image capture device, pre-incident media for the location-based cluster;

relate the pre-incident media to the location-based cluster;

communicates the pre-incident media and relation information relating the pre-incident media with the location-based cluster to the responder device; and identify location behavior based on a comparison of post-incident media to pre-incident media.

4. The server of claim 1, wherein the electronic processor is further configured to assign a first communication device of the plurality of communication devices from a first location-based cluster of the plurality of location-based clusters as a designated device;

establish a communication link with the designated device while de-prioritizing communications with other communication devices from the first location-based cluster;

receive feedback relating to the incident from the designated device; and re-rank the plurality of location-based clusters based on the feedback.

5. The server of claim 4, wherein the electronic processor is further configured to determine a loss of the communication link with the designated device; and assign a second communication device of the plurality of communication devices from the first location-based cluster as the designated device.

6. The server of claim 1, wherein the electronic processor is further configured to predict, using an artificial intelligence (AI) prediction model, the incident based on pre-incident media of the geographical area.

7. The server of claim 1, wherein the electronic processor is configured to rank the plurality of location-based clusters further based on predetermined cluster parameters including at least one selected from a group consisting of number of communication devices within a location-based cluster, demographics of owners of communication devices within a location-based cluster, proximity of a location-based cluster to a high-impact zone of the incident.

8. A method for disaster prediction and response comprising:

broadcasting, using an electronic processor, an incident alert to a plurality of communication devices within a geographical area associated with an imminent incident, the incident alert including an enrollment feature;

receiving, via the enrollment feature in response to the incident alert using the electronic processor, enrollment notifications from the plurality of communication devices for enrolling the plurality of communication devices in incident response repeated location tracking for the incident;

dividing, using the electronic processor, the plurality of communication devices into a plurality of location-based clusters based on pre-incident location information of the plurality of communication devices; and ranking, using the electronic processor, the plurality of location-based clusters based on location behavior of communications devices within each of the plurality of location-based clusters;

labeling a first subset of the plurality of communication devices as operable based on determining a current location of the first subset of the plurality of communication devices;

labeling a second subset of the plurality of communication devices as non-operable based on determining that a current location of the second subset of the plurality of communication devices cannot be determined; and assigning a higher rank to a first location-based cluster of the plurality of location-based clusters than a second location-based cluster of the plurality of location-based clusters when the first location-based cluster has a higher number of non-operable communication devices than the second location-based cluster.

9. The method of claim 8, further comprising:

communicating locations and ranking of the plurality of location-based clusters to a responder device.

10. The method of claim 9, further comprising:

identifying an image capture device having a field of view of a location-based cluster of the plurality of location-based clusters;

collecting, using the image capture device, pre-incident media for the location-based cluster;

relating the pre-incident media to the location-based cluster;

communicating the pre-incident media and relation information relating the pre-incident media with the location-based cluster to the responder device; and identifying location behavior based on a comparison of current post-incident media to pre-incident media.

11. The method of claim 8, further comprising:

assigning a first communication device of the plurality of communication devices from a first location-based cluster of the plurality of location-based clusters as a designated device;

establishing a communication link with the designated device while de-prioritizing communications with other communication devices from the first location-based cluster;

receiving feedback relating to the incident from the designated device; and re-ranking the plurality of location-based clusters based on the feedback.

12. The method of claim 11, further comprising:

determining a loss of the communication link with the designated device; and assigning a second communication device of the plurality of communication devices from the first location-based cluster as the designated device.

13. The method of claim 8, further comprising:

predicting, using an artificial intelligence (AI) prediction model, the incident based on pre-incident media of the geographical area.

14. The method of claim 8, further comprising:

ranking the plurality of location-based clusters further based on predetermined cluster parameters including at least one selected from a group consisting of number of communication devices within a location-based cluster, demographics of owners of communication devices within a location-based cluster, proximity of a location-based cluster to a high-impact zone of the incident.

* * * * *